(12) United States Patent
Wong et al.

(10) Patent No.: US 9,207,784 B2
(45) Date of Patent: Dec. 8, 2015

(54) PRESSURE-SENSITIVE ELECTROMAGNETIC POINTER AND CONTROL METHOD THEREOF

(71) Applicant: Wacom Co., Ltd., Saitama (JP)

(72) Inventors: A-Li Wong, Hsin-Chu (TW); Chih-Jen Li, Hsinchu (TW); Chia-Jui Yeh, Taipei (TW)

(73) Assignee: Wacom Co., Ltd., Saitama (JP)

( * ) Notice: Subject to any disclaimer, the term of this patent is extended or adjusted under 35 U.S.C. 154(b) by 168 days.

(21) Appl. No.: 13/747,074

(22) Filed: Jan. 22, 2013

(65) Prior Publication Data

US 2014/0152627 A1    Jun. 5, 2014

(30) Foreign Application Priority Data

Nov. 30, 2012 (TW) .............................. 101145019 A (51) Int. Cl.
*G06F 3/033* (2013.01)
*G06F 3/0354* (2013.01)

(52) U.S. Cl.
CPC .................................. *G06F 3/03545* (2013.01)

(58) Field of Classification Search
CPC .................................................. G06F 3/03545
USPC .................................................. 345/173, 179
See application file for complete search history.

(56) References Cited

U.S. PATENT DOCUMENTS

| 5,206,785 A | 4/1993 | Hukashima |
| 5,565,632 A | 10/1996 | Ogawa |
| 7,176,907 B2 * | 2/2007 | Chao et al. ..................... 345/179 |
| 8,217,918 B2 * | 7/2012 | Morag et al. .................. 345/179 |
| 2008/0158165 A1 * | 7/2008 | Geaghan et al. .............. 345/173 |
| 2011/0175845 A1 | 7/2011 | Honda et al. |

FOREIGN PATENT DOCUMENTS

| TW | 372269 U | 1/2010 |
| TW | 407433 U | 7/2011 |

OTHER PUBLICATIONS

Taiwanese Office Action dated Jun. 2, 2015, for corresponding TW Application No. 101145019, 6 pages.

* cited by examiner

*Primary Examiner* — Kwang-Su Yang
(74) *Attorney, Agent, or Firm* — Seed IP Law Group PLLC (57) ABSTRACT

An electromagnetic pressure-sensitive pointer is disclosed. The electromagnetic pointer comprises a pen core and an oscillating circuit. The pointer core has a pointer tip. The oscillating circuit comprises a plurality of conductive terminals and a conductor. A capacitance of the oscillating circuit is increased through the contact between the conductive terminals and the conductor as a force is applied upon the pointer tip. When pointer's tip is been pressed, the pointer's frequency will have an obvious transition while its pressure-sensitivity is maintained.

18 Claims, 8 Drawing Sheets

PRESSURE-SENSITIVE ELECTROMAGNETIC POINTER AND CONTROL METHOD THEREOF

CROSS-REFERENCE TO RELATED APPLICATIONS

The entire contents of Taiwan Patent Application No. 101145019, filed on Nov. 30, 2012, from which this application claims priority, are incorporated herein by reference.

BACKGROUND OF THE INVENTION

1. Field of the Invention

The present invention generally relates to a pressure-sensitive electromagnetic pointer and the control method thereof, and more particularly to an electromagnetic pointer and the control method thereof which use the writing force applied upon to suddenly alter the emitting frequency.

2. Description of the Related Art

The operation principle of electromagnetic type input technology is performed by a circuit board with a plurality of antennas or sensor coils arranged along axial directions and an electromagnetic pen which can emit electromagnetic signals. The sensing plane of an electromagnetic input apparatus includes a plurality of antennas or sensor coils. The antennas or sensor coils are arranged under a work surface or a display panel of the electromagnetic input apparatus. The coordinates of the electromagnetic pen are obtained through the transmitting and receiving of electromagnetic waves between the circuit of the electromagnetic pen and the antennas or the sensor coils.

Input apparatuses which use the electromagnetic type input technology comprise smart mobile devices (Smart Phone), digitizers or tablets or e-books/green books and are used with electromagnetic pens or styluses.

The circuit of the electromagnetic pen usually comprises an inductor, a capacitor and relative components enclosed in a case. The inductor constituted by a ferrite core winded with a metal coil and the capacitor constitute the circuit to transmit and receive electromagnetic signals with the antennas or sensor coils. The frequency of the circuit is determined according to the capacitance and the inductance connected in parallel. When a user utilizes the electromagnetic pen to perform writing function on the input apparatus, the tip of the electromagnetic pen being pressed would induce the continuous changes of the inductance or capacitance as well as the frequency of the circuit. The input apparatus detects and calculates the frequency of the electromagnetic signals received to obtain pressure levels of the electromagnetic pen via an internal circuit.

For example, in U.S. Pat. No. 5,206,785, the main design principle involves continuous variation of capacitance induced by pressing the pen tip. While in U.S. Pat. No. 5,565,632, the disclosure involves continuous variation of inductance caused by pressing the pen tip. The designer of the electromagnetic pen can choose either the inductor or capacitor to be variable or adjustable according to the requirement and determine the variation ranges of the capacitance or inductance.

Both the two principles set forth have a disadvantage. Since both principles involve continuous variations of inductance or capacitance, the frequency variations caused by the displacement of the pen core structure may not be detected or the frequency variations are very tiny such that the input apparatus is unable to detect the frequency variations when the pen tip of the electromagnetic pen is pressed by a relatively small force. These design principles are not able to allow a user to start writing just after slightly touching the pen tip.

In US Pub. 20110175845, the operation principle involves a structure of activating a micro switch via a pen tip. The electromagnetic pen lacks a structure of variable inductor or capacitor varying according to the displacement of the pen tip. Thus the frequency of the oscillation circuit of the electromagnetic pen is unable to vary along with the displacement of the pen tip. The electromagnetic pen with such design structure does not have a pressure-sensitive level function of pen tip.

In view of the above shortcomings of the previous designs, the invention provides a new electromagnetic pointer and the control method thereof. When a user utilizes the electromagnetic pointer with an input apparatus, the tip of the electromagnetic pointer with a micro force applied upon suddenly alters capacitance connected in parallel with the oscillation circuit of the electromagnetic pointer so as to discontinuously change the emitting frequency of the electromagnetic pointer at the beginning of the pressing of the tip through the pressure-sensitive level function of the tip of the electromagnetic pointer.

SUMMARY OF THE INVENTION

One object of the invention is to provide a pressure-sensitive electromagnetic pointer and the control method thereof which allow a user to trigger the function through a tiny force applied upon the tip of the electromagnetic pointer. The force applied on the tip of the electromagnetic pointer suddenly changes the frequency of the electromagnetic pointer to activate the writing function of the electromagnetic pointer accompanying with the tip pressure-sensitive level of electromagnetic pointer.

The invention provides a control method for an electromagnetic pointer, and the method comprises the following step. First of all, an electromagnetic pointer and an input apparatus are provided. The electromagnetic pointer comprises a core and an oscillation circuit. The oscillation circuit comprises a plurality of conductive terminals and a conductive device, a capacitance of the oscillation circuit is increased through the core pushing the conductive device to connect the conductive terminals. Then a tip of the core is applied against the input apparatus to push the conductive device to connect the conductive terminals and to increase the capacitance of the oscillation circuit so as to suddenly change a frequency of the oscillation circuit. The frequency from the electromagnetic pointer will discontinuously vary during the initial stage which the tip is pressed to activate the writing function of the electromagnetic pointer accompanying with the process of dynamically adjusting tip pressure-sensitive levels of electromagnetic pointer and maintaining the tip pressure-sensitive level of electromagnetic pointer.

The invention provides an electromagnetic pointer, and the electromagnetic pointer comprises a core having a tip and an oscillation circuit. The oscillation circuit comprises a plurality of conductive terminals and a conductive device, a capacitance of the oscillation circuit is increased through the core pushing the conductive device to connect the conductive terminals so as to suddenly change a frequency of the oscillation circuit.

The invention further provides a method for determining a frequency variation mode of an electromagnetic pointer, and the method comprises the following step. First of all, a frequency $f_n$ of an electromagnetic pointer is detected. Then whether the frequency $f_n$ is smaller than a tip-on threshold frequency $f_{on}$ which a writing trace starts to appear is judged.

Next whether the frequency $f_n$ is smaller than an upper limit frequency $f_{UB}$ which is designated as the frequency when a first stage of a switch of the electromagnetic pointer is turned on is judged. Then whether the frequency $f_n$ is smaller than the lower limit frequency $f_{LB}$ which is designated as the frequency when a second stage of a switch of the electromagnetic pointer is turned on is judged.

The invention further provides a method for dynamically adjusting tip pressure-sensitive levels of an electromagnetic pointer, and the method comprises the following step. First of all, a frequency $f_n$ and a minimum pressure-sensitive level frequency $f_1$ of the electromagnetic pointer are compared. Then whether the frequency $f_n$ larger than the minimum pressure-sensitive level frequency $f_1$ is judged. Next whether the frequency $f_n$ is larger than a maximum pressure-sensitive level frequency $f_2$ is judged. Then the maximum pressure-sensitive level frequency $f_2$ is refreshed so that the frequency $f_n$ is a new maximum pressure-sensitive level frequency if the frequency $f_n$ is larger than the maximum pressure-sensitive level frequency $f_2$. Tip pressure-sensitive levels of the electromagnetic pointer are calculated according to the new maximum pressure-sensitive level frequency and the minimum pressure-sensitive level frequency $f_1$.

DETAILED DESCRIPTION OF THE INVENTION

Embodiment of this invention will be described in detail below. However, in addition to as described below, and this invention can be broadly implemented in the other cases the purpose and scope of this invention is not affected by the application of qualified, claim after its prevail. Furthermore, to provide a description clearer and easier to understand the invention, the pieces within the schema and not in accordance with their relative size of drawing, compared to certain dimensions to other scales have been exaggerated; details not related nor completely drawn in part in order to schematic simplicity.

Figure 1:
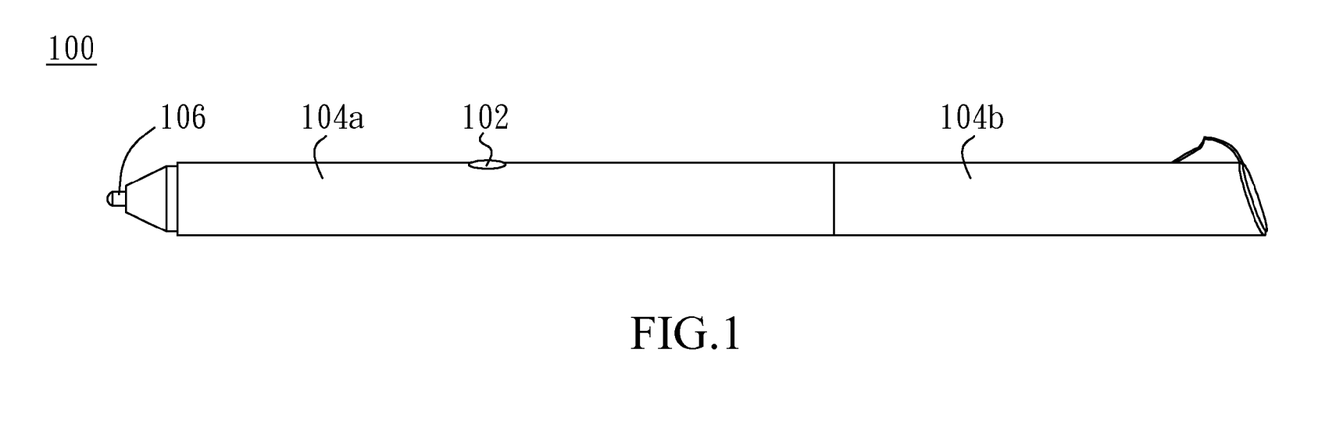
FIG. 1 shows an electromagnetic pointer according to one embodiment of the present invention.

FIG. 1 shows an electromagnetic pointer according one embodiment of the present invention. As shown in FIG. 1, the electromagnetic pointer 100 comprises a switch 102, pointer cases 104a and 104b and a pointer core 106.

Figure 2:
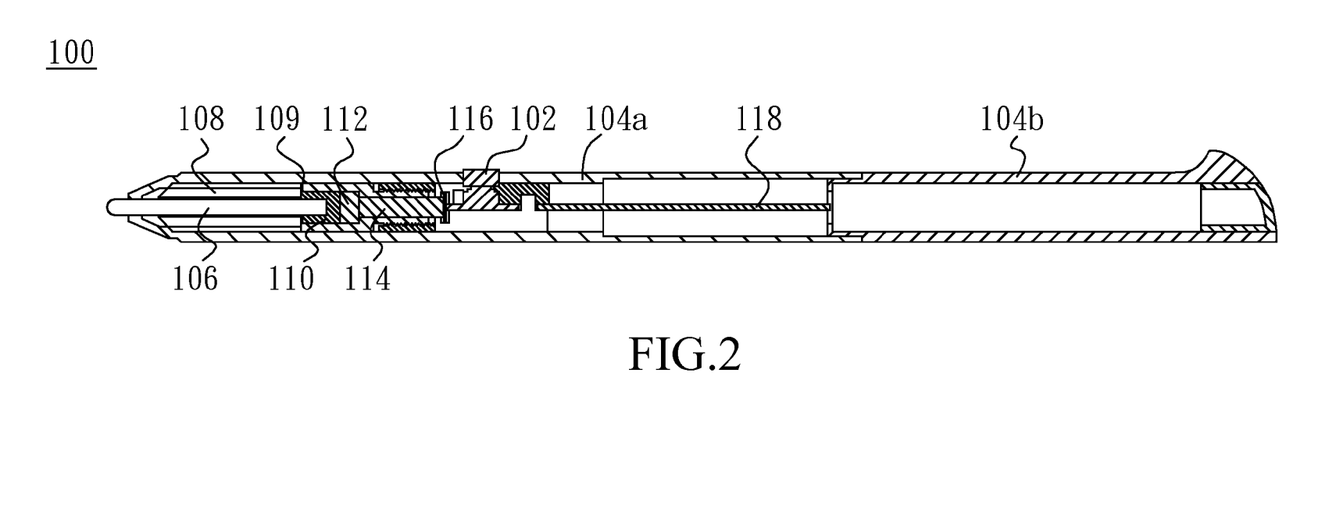
FIG. 2 is a cross-sectional view of the electromagnetic pointer shown in FIG. 1 according to one embodiment of the present invention.

FIG. 2 is a cross-sectional view of the electromagnetic pointer shown in FIG. 1 according to one embodiment of the present invention. The electromagnetic pointer shown in FIGS. 1 and 2 is merely an example of one embodiment of the invention, not a limitation. The embodiment of the invention is able to be applied any other suitable electromagnetic pointer.

The electromagnetic pointer 100 shown in FIG. 2 comprises the switch 102, the pointer cases 104a and 104b, the pointer core 106, ferrite cores 108 and 110, a buffer 109, an elastomer 112, a touch pin 114, a conductor device 116 and a circuit board 118. The pointer cases 104a and 104b accommodate the pointer core 106, the ferrite cores 108 and 110, the buffer 109, the elastomer 112, the touch pin 114, the conductor device 116 and the circuit board 118. A conductive coil is configured to wind the ferrite core 108, the conductive coil is configured to be connected to the circuit of the circuit board 118. The conductive coil, the ferrite cores 108 and 110 constitute a variable inductor. The conductive device 116 comprises a cone spring or a conductive rubber, but is not limited to a cone spring or a conductive rubber.

In this embodiment of the invention, the ferrite core 108 is hollow. The pointer core 106 penetrates through the ferrite core 108 so that the pointer core 106 is able to slide through the ferrite core 108. The ferrite core 110 includes a groove or a trench or a concave to accommodate one end of the pointer core 106. When the pointer core 106 is moved axially inside the ferrite core 108, the end of the pointer core 106 configured in the groove of the ferrite core 110 pushes the ferrite core 108 to generate a relative displacement between the ferrite core 110 and the ferrite core 108 with the winding coil. The elastomer 112 is located between the ferrite core 110 and the touch pin 114. When the ferrite core 110 is pushed by the pointer core 106 to generate a relative displacement between the ferrite core 110 and the ferrite core 108 with the winding coil, the elastomer 112 will be compressed and push the touch pin 114 and the touch pin 114 will push the conductive device 116.

The circuit board 118 is configured to be secured in the pointer cases 104a and 104b. The end of the circuit board 118 toward the tip of the electromagnetic pointer has a plurality of conductive terminals. The conductive terminals of the circuit board 118 are electrically connected through the conductive device 116 after the touch pin 114 pushes the conductive device 116. Detail content will be further described in the following description. The switch 102 is configured to be located on the circuit board 118 and extend out from the pointer case 104a. The switch 102 is used as a switch of the circuit board 118.

In one embodiment of the invention, the circuit board 118 comprises a printed circuit board with an oscillation circuit and a controller so that the electromagnetic pointer is able to transmit electromagnetic signals to an electromagnetic input apparatus, or to receive electromagnetic signals from electromagnetic antenna loops or sensor coils of the electromagnetic input apparatus. The electromagnetic input apparatus comprises a smart mobile communication device, a digitizer or a tablet or an eBook.

Figure 2A:
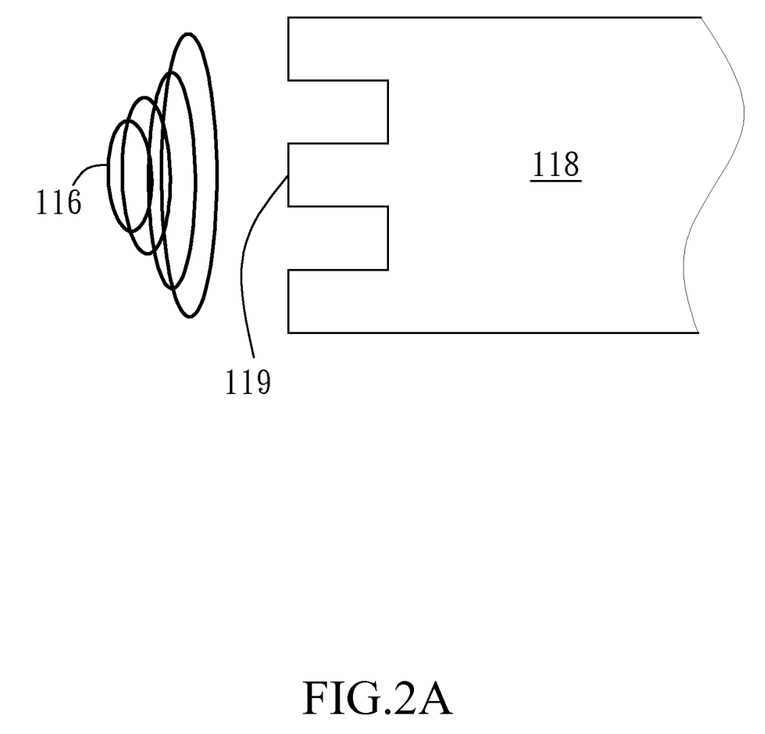
FIG. 2A shows a schematic diagram of a switch formed by the conductive device and the conductive terminals of the circuit board according to one embodiment of the invention.

FIG. 2A shows a schematic diagram of a switch formed by the conductive device and the conductive terminals of the circuit board according to one embodiment of the invention. In one embodiment which the conductive device 116 is a cone spring, when one end of the touch pin 114 pushes the cone spring, the center of the cone spring will contact the conductive terminals on one end of the circuit board 118 to electrically connect the conductive terminals and change the circuitry of the circuit board 118 so as to alter the frequency of the LC oscillation circuit. Detail content will be further described in the following description. The arrangement with a distance between the cone spring and the conductive terminals is just for clearer and easier to understand. In actual arrangement, the cone spring is configured to contact the conductive terminals while only the center portion of the cone spring maintains a distance from the central conductive terminal 119 when the touch pin 114 does not push the cone spring.

Figure 2B:
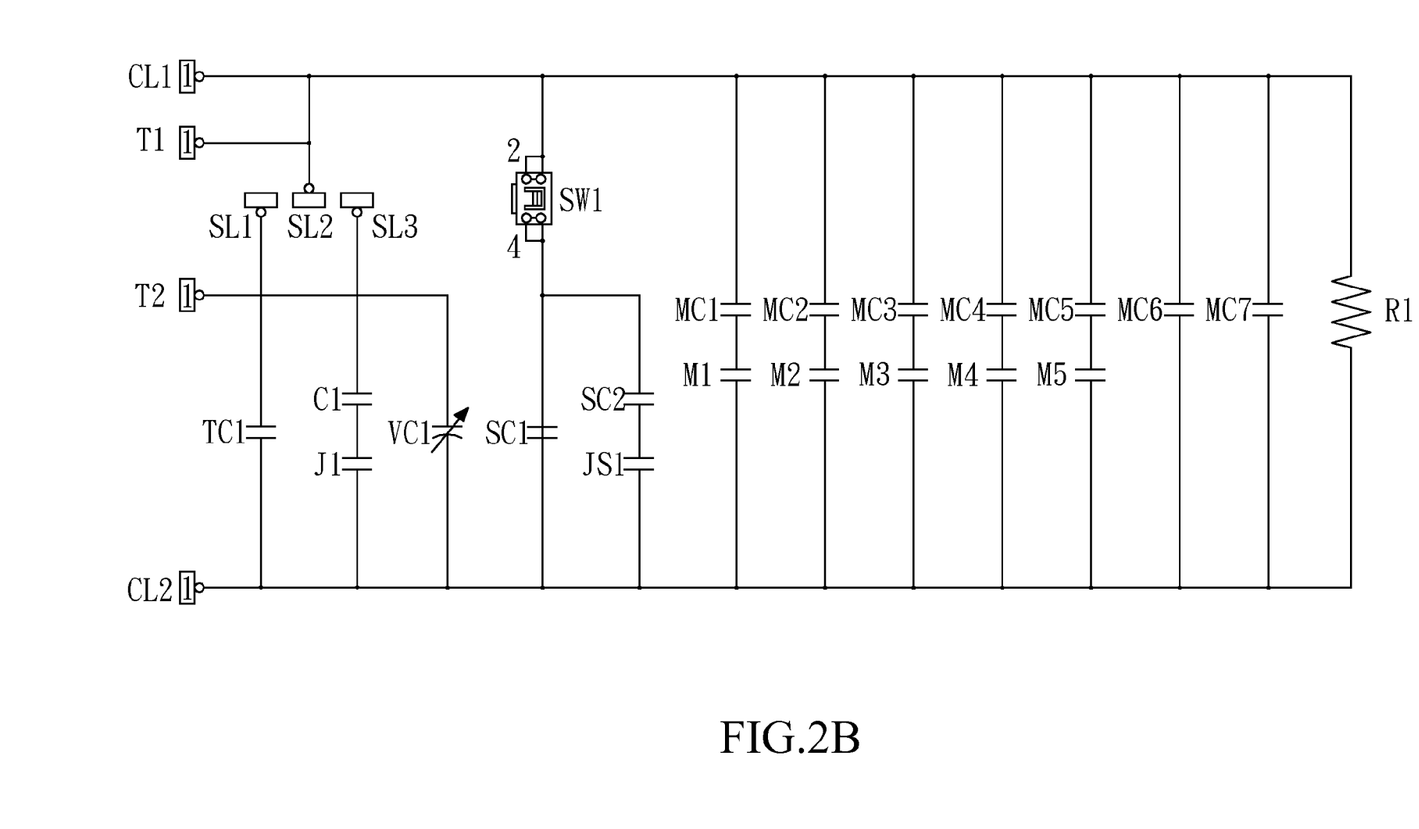
FIG. 2B shows a LC oscillation circuit of an electromagnetic pointer according to one embodiment of the invention.

FIG. 2B shows a LC oscillation circuit of an electromagnetic pointer according to one embodiment of the invention. CL1 and CL2 are designated as two terminals of the equivalent inductor of the LC oscillation circuit. Whether capacitors VC1, C1, TC1 and J1 are connected with capacitors MC1-MC7 and M1-M5 in parallel is determined via the connection between conductive terminal SL1, SL2 and SL3. Referring to FIG. 2A, the conductive terminal SL2 is equivalent to the central conductive terminal 119. When the center portion of the cone spring contacts the central conductive terminal 119, which is equivalent to the conductive terminal SL2 connecting the conductive terminal SL1 and SL3, the capacitors VC1, C1, TC1 and J1 will connect with capacitors MC1-MC7 and M1-M5 in parallel. According to the equation, $$f = \frac{1}{2\pi\sqrt{LC}}$$

The frequency f will be decreased when the capacitor C is increased, wherein L is the inductance.

Switch SW1 shown in FIG. 2B is equivalent to the switch on the circuit board 118 activated by the switch 102. Whether capacitors SC1, SC2 and JS1 are connected with capacitors MC1-MC7 and M1-M5 in parallel is determined via the switch SW1 to vary the frequency of the oscillation circuit of the electromagnetic pointer so as to perform functions of the electromagnetic pointer. The functions comprise simulating mouse left and right click switches, a writing function switch or an erasing (eraser) function switch.

Figure 3:
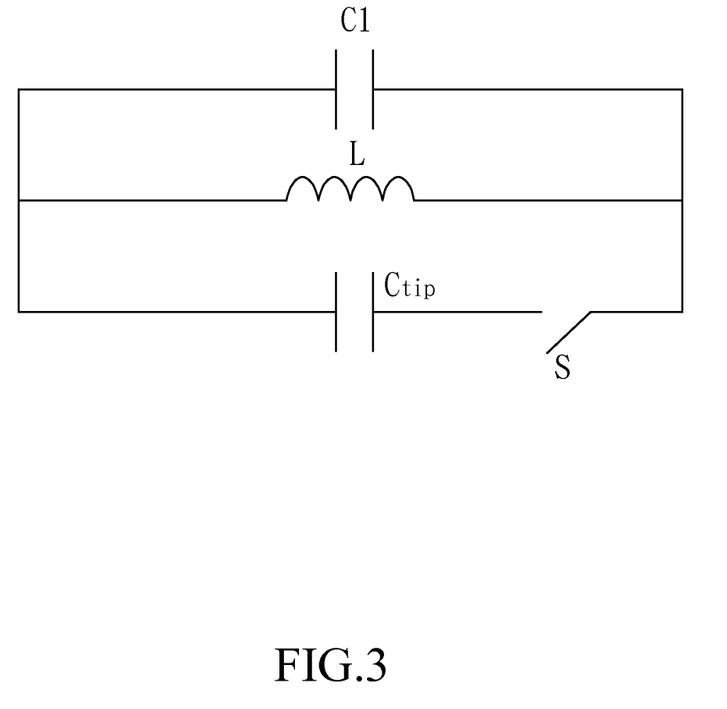
FIG. 3 shows an equivalent circuit of a LC oscillation circuit of an electromagnetic pointer according to one embodiment of the invention.

FIG. 3 shows an equivalent circuit of a LC oscillation circuit of an electromagnetic pointer according to one embodiment of the invention. It is noted that the equivalent circuit in FIG. 3 is not entirely the same with the LC oscillation circuit in FIG. 2B, but both are used to illustrate the embodiments of the invention. Inductor L is designated as the equivalent inductance of the LC oscillation circuit, capacitor $C_1$ is designated as the equivalent capacitance of LC oscillation circuit and capacitor $C_{tip}$ is controlled by switch S. In one embodiment of the invention, in connection with the embodiment shown in FIG. 2A, the switch S comprising the conductive device 116 and the conductive terminal 119 is activated to connect the capacitor $C_{tip}$ with the capacitor $C_1$ in parallel, the parallel connection between the capacitor $C_{tip}$ and the capacitor $C_1$ will increase the new equivalent capacitance and cause a sudden or abrupt decrease of the frequency of the LC oscillation circuit. In connection with the embodiment shown in FIG. 2, when the conductive device 116 is pushed by the touch pin 114 to connect the conductive terminals of the circuit board 118, the gradual variation of the frequency of the LC oscillation circuit will suddenly be altered to an abrupt drop. The abrupt drop of frequency variation is able to be used as a signal to notify an input apparatus to activate the writing function of the electromagnetic pointer.

Figure 4A:
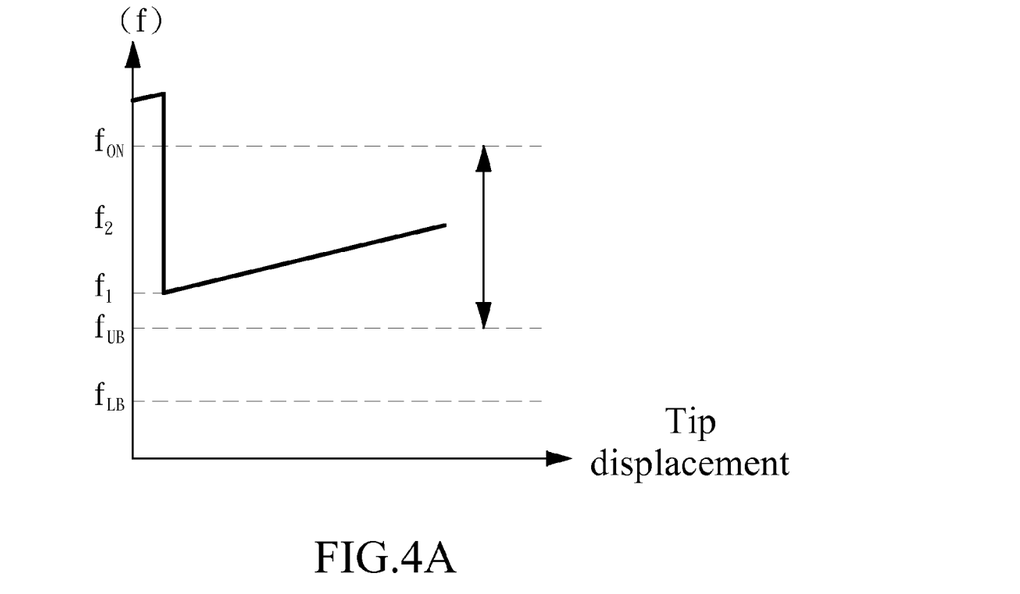
FIGS. 4A and 4B show two abrupt and discontinuous frequency variation modes of two LC oscillation circuits according to two embodiments of the invention respectively.
Figure 4B:
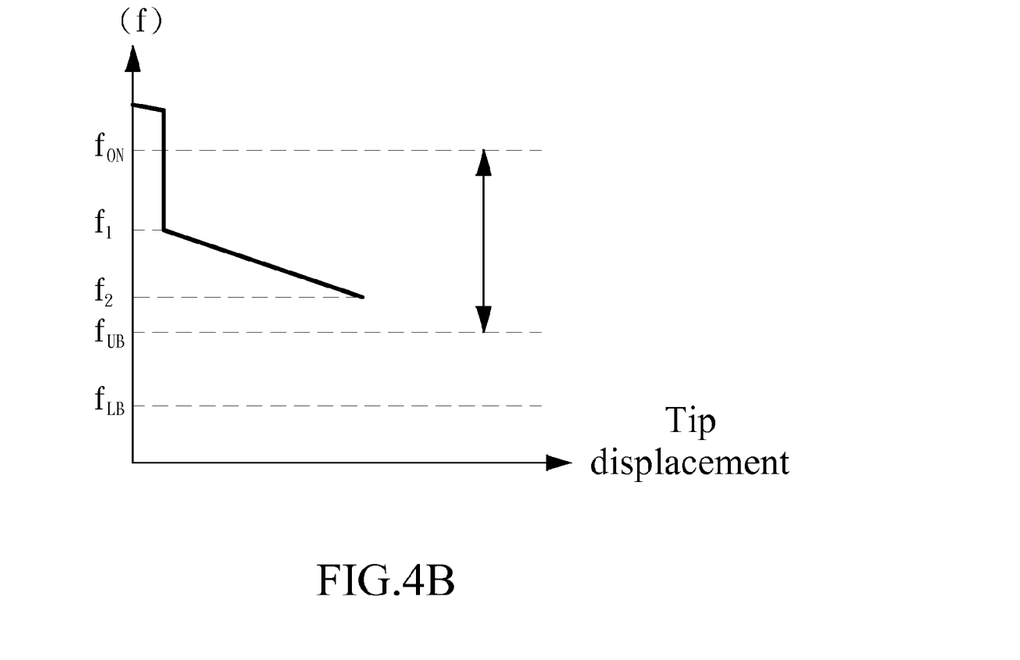

FIGS. 4A and 4B show two abrupt and discontinuous frequency variation modes of two LC oscillation circuits according to two embodiments of the invention respectively. The discontinuous frequency variation mode of the LC oscillation circuit shown in FIG. 4A involves a gradual decrease of an equivalent inductance of the LC oscillation circuit and a gradual increase of a frequency of the LC oscillation circuit when the tip or pointer core of the electromagnetic pointer is being pressed. As shown in FIG. 4A, as the tip or of the electromagnetic pointer continues to be pressed, the equivalent inductance of the LC oscillation circuit continues to decrease and the frequency continues to increase until an abrupt and discontinuous frequency variation occurs. One embodiment triggering the abrupt and discontinuous frequency variation is shown in FIG. 2A, wherein the touch pin 114 pushes the conductive device 116 to connect the conductive terminals of the circuit board 118 to connect an additional capacitor in parallel with the LC oscillation circuit. Another embodiment triggering the abrupt and discontinuous frequency variation is shown in FIG. 2B, wherein the capacitors VC1, C1, TC1 and J1 are connected with the capacitors MC1-MC7 and M1-M5 in parallel via the connection between the conductive terminal SL1, SL2 and SL3. Still another embodiment triggering the abrupt and discontinuous frequency variation is shown in FIG. 3, wherein the capacitor $C_{tip}$ is connected with the capacitor $C_1$ in parallel by the switch S to increase the new equivalent capacitance and cause a sudden or abrupt decrease of the frequency of the LC oscillation circuit.

When the frequency of the electromagnetic pointer is lower than a tip-on threshold frequency $f_{on}$ on which a writing trace starts to show, a writing function of the electromagnetic pointer is activated. As the frequency of the LC oscillation circuit of the electromagnetic pointer achieves a minimum pressure-sensitive level frequency $f_1$, the electromagnetic pointer is able to draw the minimum width of writing trace. As the tip of the electromagnetic pointer is continued being pressed, the equivalent inductance of the LC oscillation circuit continue to decrease to gradually increase the frequency of the LC oscillation circuit so that the width of writing trace will also gradually increase until the frequency of the LC oscillation circuit achieves a maximum pressure-sensitive level frequency $f_2$. It is noted that the adjustment of the pressure-sensitive level of the tip of the electromagnetic pointer is dynamic. In one embodiment of the invention, the adjustment range of the pressure-sensitive level of the tip of the electromagnetic pointer is between the tip-on threshold frequency $f_{on}$ and an upper limit frequency $f_{UB}$ of the switch 102. The upper limit frequency $f_{UB}$ and a lower limit frequency $f_{LB}$ of the switch 102 depend on the circuit design of the electromagnetic pointer.

The discontinuous frequency variation mode of the LC oscillation circuit shown in FIG. 4B involves a gradual increase of an equivalent inductance of the LC oscillation circuit and a gradual decrease of a frequency of the LC oscillation circuit when the tip or pointer core of the electromagnetic pointer is being pressed. As shown in FIG. 4B, as the tip or of the electromagnetic pointer continues to be pressed, the equivalent inductance of the LC oscillation circuit continues to increase and the frequency continues to decrease until an abrupt and discontinuous frequency variation occurs. One embodiment triggering the abrupt and discontinuous frequency variation is shown in FIG. 2A, wherein the touch pin 114 pushes the conductive device 116 to connect the conductive terminals of the circuit board 118 to connect an additional capacitor in parallel with the LC oscillation circuit. Another embodiment triggering the abrupt and discontinuous frequency variation is shown in FIG. 2B, wherein the capacitors VC1, C1, TC1 and J1 are connected with the capacitors MC1-MC7 and M1-M5 in parallel via the connection between the conductive terminal SL1, SL2 and SL3. Still another embodiment triggering the abrupt and discontinuous frequency variation is shown in FIG. 3, wherein the capacitor $C_{tip}$ is connected with the capacitor $C_1$ in parallel by the switch S to increase the new equivalent capacitance and cause a sudden or abrupt decrease of the frequency of the LC oscillation circuit.

When the frequency of the electromagnetic pointer is lower than a tip-on threshold frequency $f_{on}$ on which a writing trace starts to show, a writing function of the electromagnetic pointer is activated. As the frequency of the LC oscillation circuit of the electromagnetic pointer achieves a minimum pressure-sensitive level frequency $f_1$, the electromagnetic pointer is able to draw the minimum width of writing trace. As the tip of the electromagnetic pointer is continued being pressed, the equivalent inductance of the LC oscillation circuit continue to increase to gradually decrease the frequency of the LC oscillation circuit so that the width of writing trace will also gradually increase until the frequency of the LC oscillation circuit achieves a maximum pressure-sensitive level frequency $f_2$. It is noted that the adjustment of the pressure-sensitive level of the tip of the electromagnetic pointer is dynamic. In one embodiment of the invention, the adjustment range of the pressure-sensitive level of the tip of the electromagnetic pointer is between the tip-on threshold frequency $f_{on}$ and an upper limit frequency $f_{UB}$ of a side switch such as the switch 102. The upper limit frequency $f_{UB}$ and the lower limit frequency $f_{LB}$ are designated as the frequencies when first and second stages of the switch of the electromagnetic pointer are turned on respectively.

Whether the equivalent inductance of the LC oscillation circuit is decreased or increased when the tip of the electromagnetic pointer is pressed depends the configuration of the ferrite core and the winding coil and the internal structure of the electromagnetic pointer. It is noted that the embodiments of the invention focus on the function of the electromagnetic pointer rather than the configuration thereof. Thus the function of the embodiments of the invention is able to be applied upon any suitable configuration of the electromagnetic pointer according to various requirements. The configuration to which the function of the embodiments of the invention is applied depends on requirement.

Figure 5A:
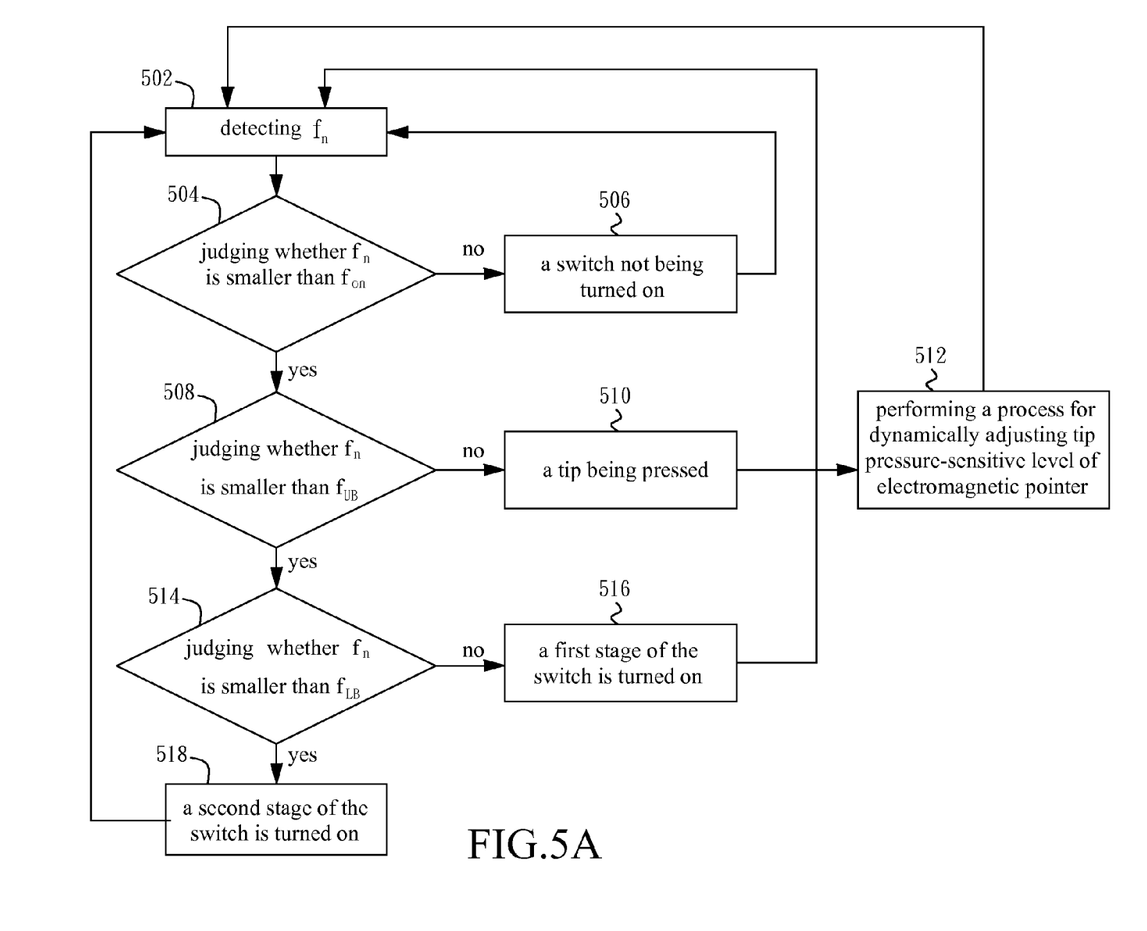
FIG. 5A shows a method for determining a frequency variation mode of an electromagnetic pointer.
Figure 5B:
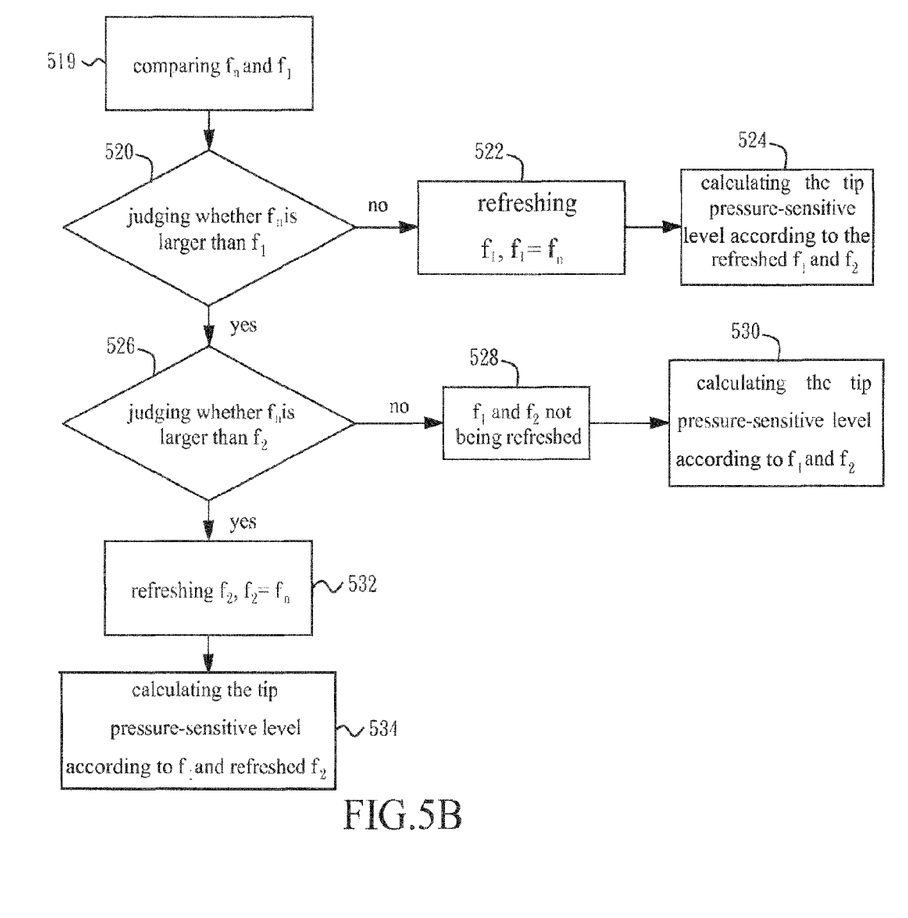
FIG. 5B shows a method for dynamically adjusting tip pressure-sensitive level of an electromagnetic pointer.

FIGS. 5A and 5B show a method for determining a frequency variation mode of electromagnetic pointer and a method for dynamically adjusting tip pressure-sensitive level of electromagnetic pointer respectively. As shown in FIG. 5A, first of all, a frequency $f_n$ of an electromagnetic pointer is detected in step 502. Then whether the frequency $f_n$ is smaller than the tip-on threshold frequency $f_{on}$ is judged in step 504. If the frequency $f_n$ is not smaller than the tip-on threshold frequency $f_{on}$, then a status of the electromagnetic pointer that a switch is not turned on is determined in step 506. If the frequency $f_n$ is smaller than the tip-on threshold frequency $f_{on}$, then whether the frequency $f_n$ is smaller than the upper limit frequency $f_{UB}$ is judged in step 508. If the frequency $f_n$ is not smaller than the upper limit frequency $f_{UB}$, then a status of the electromagnetic pointer that the tip is being pressed (tip on) is determined in step 510 and a process for dynamically adjusting tip pressure-sensitive level of electromagnetic pointer is performed in step 512. If the frequency $f_n$ is smaller than the upper limit frequency $f_{UB}$, then whether the frequency $f_n$ is smaller than the lower limit frequency $f_{LB}$ is judged in step in step 514. If the frequency $f_n$ is not smaller than the lower limit frequency $f_{LB}$, then a status of the electromagnetic pointer that a first stage of the switch is turned on is determined in step 516. If the frequency $f_n$ is smaller than the lower limit frequency $f_{LB}$, then a status of the electromagnetic pointer that a second stage of the switch is turned on is determined in step 518.

FIG. 5B shows the method for dynamically adjusting tip pressure-sensitive levels of an electromagnetic pointer corresponding to the embodiment shown in FIG. 4A. As shown in FIG. 5B, the frequency $f_n$ and the minimum pressure-sensitive level frequency $f_1$ are compared in step 519. Then whether the frequency $f_n$ is larger than the minimum pressure-sensitive level frequency $f_1$ is judged in step 520. If $f_n$ is not larger than $f_1$, then $f_1$ which the electromagnetic pointer is able to draw the minimum width of writing trace is refreshed in step 522 such that the refreshed $f_1$ is equal to $f_n$, or $f_1=f_n$. Then the tip pressure-sensitive level of electromagnetic pointer is calculated according to the refreshed $f_1$ and the maximum pressure-sensitive level frequency $f_2$ in step 524. If $f_n$ is larger than $f_1$, then whether the frequency $f_n$ is larger than the maximum pressure-sensitive level frequency $f_2$ is judged in step 526. If $f_n$ is not larger than $f_2$, then $f_1$ and $f_2$ are not refreshed in step 528. The tip pressure-sensitive level of electromagnetic pointer is calculated according to $f_1$ and $f_2$ in step 530. If $f_n$ is larger than $f_2$, then $f_2$ which the electromagnetic pointer is able to draw the maximum width of writing trace is refreshed in step 532 such that the refreshed $f_2$ is equal to $f_n$, or $f_2=f_n$. Then the tip pressure-sensitive level of electromagnetic pointer is calculated according to the refreshed $f_2$ and $f_1$ in step 534.

Figure 6:
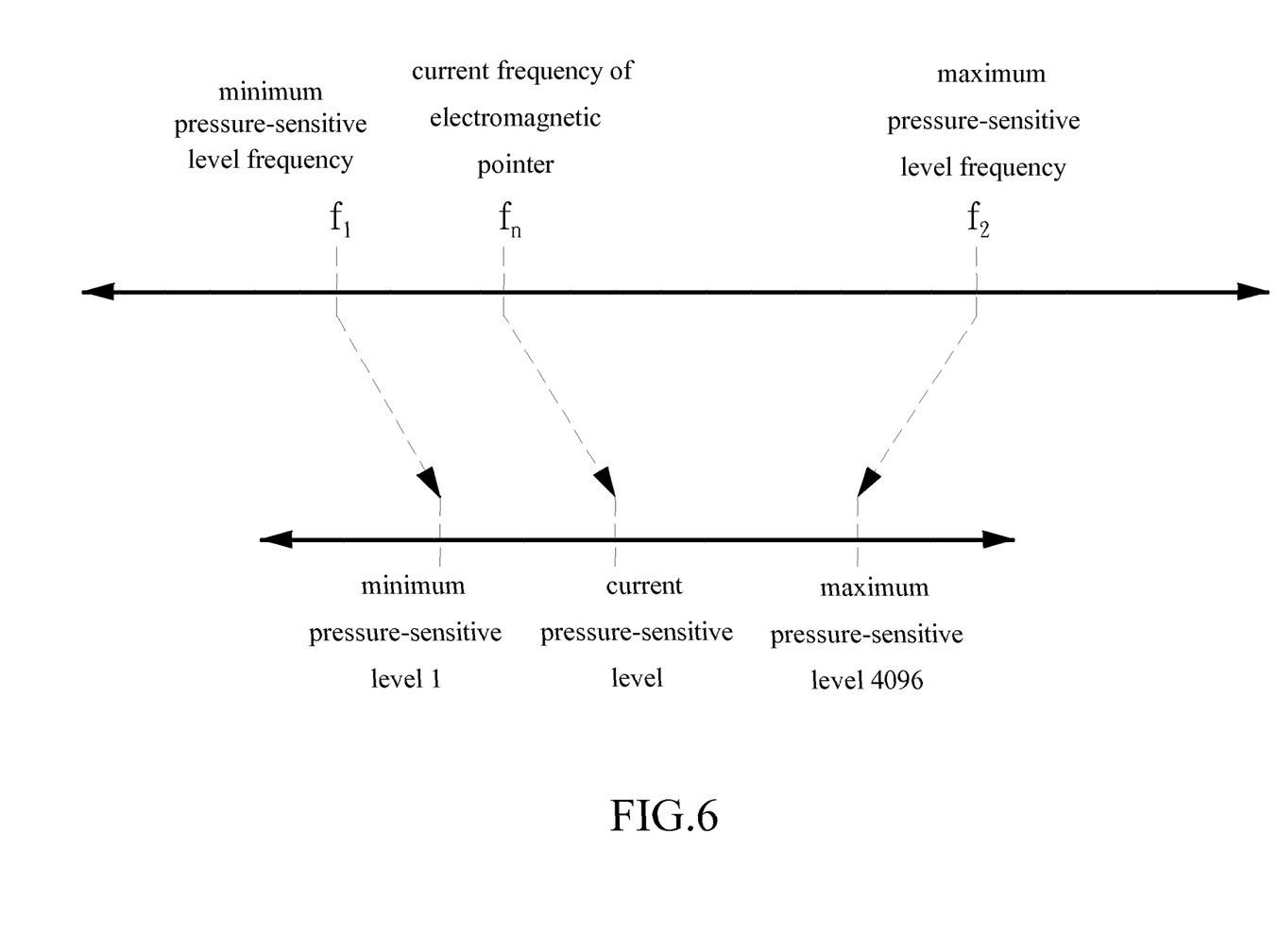
FIG. 6 shows a relation between the frequency and the tip pressure-sensitive level of electromagnetic pointer according to one embodiment of the invention.

FIG. 6 shows a relation between the frequency and the tip pressure-sensitive level of an electromagnetic pointer according to one embodiment of the invention. As shown in FIG. 6, the minimum pressure-sensitive level frequency $f_1$ and the maximum pressure-sensitive level frequency $f_2$ are dynamically refreshed while $f_n$ is the current frequency of electromagnetic pointer. The minimum pressure-sensitive level frequency $f_1$ and the maximum pressure-sensitive level frequency $f_2$ correspond to the minimum pressure-sensitive level 1 and the maximum pressure-sensitive level 4096 respectively and $f_n$ corresponds to the current pressure-sensitive level for example. If $f_1$ is 461538 Hz and $f_2$ is 470588 Hz and the number of total pressure-sensitive levels is 4096, then the current pressure-sensitive level can be calculated by the following equation, $$\text{pressure-sensitive level} = 4095 * [(f_n - 461538)/(470588 - 451538)].$$

The invention provides an electromagnetic pointer and the control method thereof which allow an user to trigger the function through a tiny force applied upon the tip of the electromagnetic pointer. The force applied on the tip of the electromagnetic pointer alters the equivalent capacitance of the oscillation circuit to suddenly change the frequency of the electromagnetic pointer. The frequency from the electromagnetic pointer will discontinuously vary during the initial stage which the tip is pressed to activate the writing function of the electromagnetic pointer accompanying with the tip pressure-sensitive level of electromagnetic pointer.

Although specific embodiments of the present invention have been described, it will be understood by those of skill in the art that there are other embodiments that are equivalent to the described embodiments. Accordingly, it is to be understood that the invention is not to be limited by the specific illustrated embodiments; but only by the scope of the appended claims.

What is claimed is:
1. An electromagnetic pointer, comprising:
a core having a tip;

an oscillation circuit including a plurality of conductive terminals and a conductive cone spring positioned between a proximal end of the core and the conductive terminals, a periphery of a base of the conductive cone spring being in electrical contact with a peripheral one of the conductive terminals, wherein when the core axially moves between an extended position and a retracted position, the center of the conductive cone spring correspondingly moves between a first position, at which it is not in electrical contact with a central one of the conductive terminals, and a second position, at which it comes in electrical contact with said central one of the conductive terminals, to thereby change a capacitance of the oscillation circuit and cause a sudden change in a frequency of the oscillation circuit;

a switch; and a controller, which, in operation:

detects a frequency $f_n$ of the oscillation circuit;

judges whether the frequency $f_n$ is smaller than a tip-on threshold frequency $f_{on}$, at which a writing trace starts to appear;

judges whether the frequency $f_n$ is smaller than an upper limit frequency $f_{UB}$, at which the switch of the electromagnetic pointer is in a first stage; and judges whether the frequency $f_n$ is smaller than the lower limit frequency $f_{LB}$, at which the switch of the electromagnetic pointer is in a second stage.

2. The electromagnetic pointer of claim 1, wherein the conductive cone spring at the second position connects the peripheral one and the central one of the conductive terminals so as to increase the capacitance of the oscillation circuit via a capacitor connected in parallel with the oscillation circuit.

3. The electromagnetic pointer of claim 1, wherein an inductance of the oscillation circuit is increased when a force applied upon the tip of the core increases.

4. The electromagnetic pointer of claim 1, wherein an inductance of the oscillation circuit is decreased when a force applied upon the tip of the core increases.

5. The electromagnetic pointer of claim 1, wherein the input apparatus and the electromagnetic pointer activate a writing function when the frequency of the oscillation circuit is suddenly changed.

6. The electromagnetic pointer of claim 1, wherein the capacitance of the oscillation circuit is increased when a force applied upon the tip of the core increases.

7. The electromagnetic pointer of claim 1, wherein the input apparatus comprises a smart mobile communication device, a digitizer, a tablet or an eBook.

8. A method for determining a frequency variation mode of an electromagnetic pointer, comprising:

providing an electromagnetic pointer and an input apparatus, the electromagnetic pointer including:

a core;

an oscillation circuit including a plurality of conductive terminals and a conductive cone spring positioned between a proximal end of the core and the conductive terminals, a periphery of a base of the conductive cone spring being in electrical contact with a peripheral one of the conductive terminals; and a switch;

applying a tip of the core against the input apparatus to axially move the core from an extended position to a retracted position, which correspondingly moves the center of the conductive cone spring from a first position, at which it is not in electrical contact with a central one of the conductive terminals, to a second position, at which it comes in electrical contact with said central one of the conductive terminals, to thereby change a capacitance of the oscillation circuit;

detecting a frequency $f_n$ of the oscillation circuit, wherein n is a positive integer;

judging whether the frequency $f_n$ is smaller than a tip-on threshold frequency $f_{on}$, at which a writing trace starts to appear;

judging whether the frequency $f_n$ is smaller than an upper limit frequency $f_{UB}$, at which the switch of the electromagnetic pointer is in a first stage; and judging whether the frequency $f_n$ is smaller than a lower limit frequency $f_{LB}$, at which the switch of the electromagnetic pointer is in a second stage.

9. The method of claim 8, wherein the switch is determined to be not turned on when the frequency $f_n$ is not smaller than the tip-on threshold frequency $f_{on}$.

10. The method of claim 8, wherein the tip is determined to be being pressed when the frequency $f_n$ is not smaller than the upper limit frequency $f_{UB}$.

11. The method of claim 8, wherein the switch is determined to be in the first stage when the frequency $f_n$ is not smaller than the lower limit frequency $f_{LB}$.

12. The method of claim 8, wherein the switch is determined to be in the second stage when the frequency $f_n$ is smaller than the lower limit frequency $f_{LB}$.

13. The method of claim 8, further comprising causing a sudden change in a frequency of the oscillation circuit.

14. The method of claim 13, wherein an inductance of the oscillation circuit is increased when a force applied upon the tip of the core increases.

15. The method of claim 13, wherein an inductance of the oscillation circuit is decreased when a force applied upon the tip of the core increases.

16. The method of claim 13, wherein the input apparatus and the electromagnetic pointer activate a writing function when the frequency of the oscillation circuit is suddenly changed.

17. The method of claim 13, wherein the capacitance of the oscillation circuit is increased when a force applied upon the tip of the core increases.

18. The method of claim 13, wherein the input apparatus comprises a smart mobile communication device, a digitizer or a tablet or an eBook.

* * * * *